INVENTORS
WALTER ALBINGER
KARL HEITZER
BY
AGENT

METHOD OF BONDING A LEADER TO MAGNETIC TAPE

Filed June 1, 1971 2 Sheets-Sheet 2

INVENTORS
WALTER ALBINGER
KARL HEITZER
BY
[signature]
AGENT

United States Patent Office 3,725,164
Patented Apr. 3, 1973

3,725,164

METHOD OF BONDING A LEADER TO MAGNETIC TAPE

Walter Albinger and Karl Heitzer, Vienna, Austria, assignors to U.S. Philips Corporation, New York, N.Y.

Filed June 1, 1971, Ser. No. 148,418
Claims priority, application Austria, June 5, 1970, A 5,053/70
Int. Cl. B29c *27/08;* G03d *15/04*
U.S. Cl. 156—73 14 Claims

ABSTRACT OF THE DISCLOSURE

The invention relates to a method and apparatus for bonding an end of a magnetic tape to an end of a thermoplastic leader tape. The magnetic tape has a base of thermoplastic material which is coated on one side. The end of the magnetic tape is placed on the end of the leader tape so as to be an overlapping relationship. An ultrasonic vibration field is applied to the overlapping tapes for a brief period of time and a static pressure is simultaneously exerted on the tapes by the vibrator. The ultrasonic field is concentrated in a strip-shaped area extending in the longitudinal direction of the tapes and is oriented at right angles to the plane of the tapes. The field has a width which is at least equal to the width of the narrower of the tapes and an overall length which is greater than the spacing between the ends of the two overlapping tapes.

Figure 1:
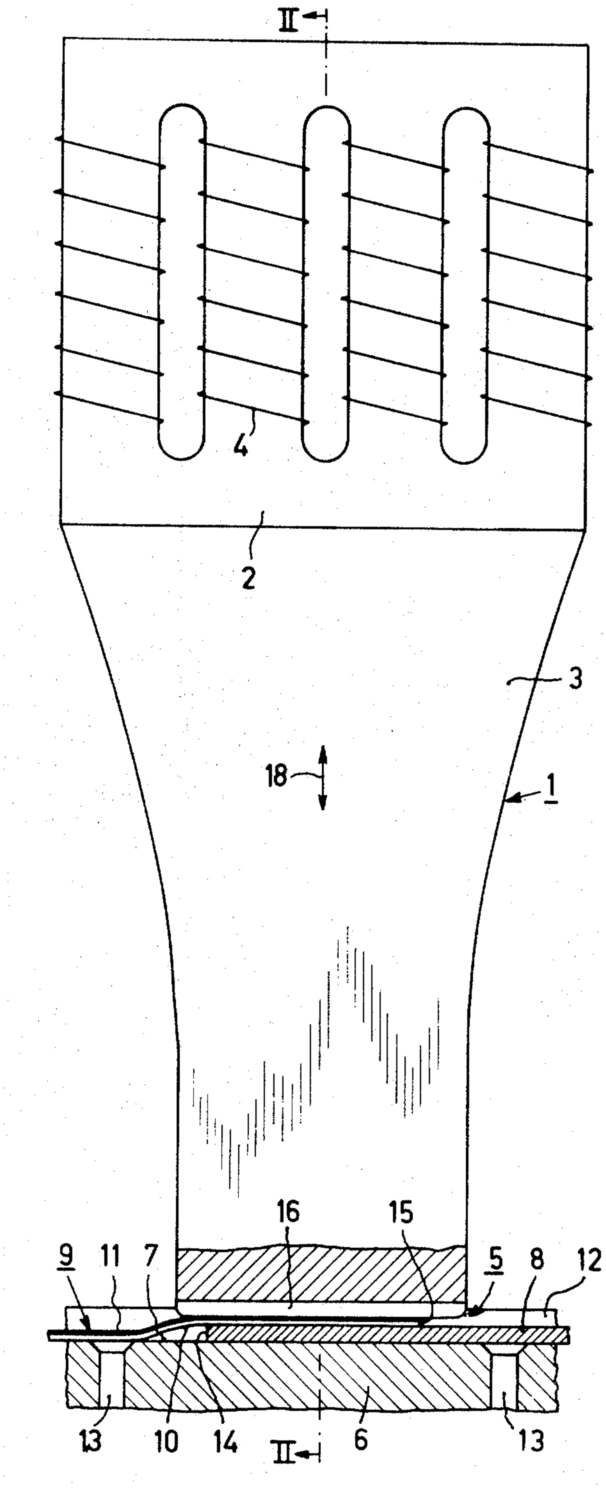

The invention relates to a method of bonding an end of a magnetic tape which has a base of a thermoplastic material coated on one surface, to an end of a thermoplastic leader tape. The invention further relates to an apparatus for carrying out the method according to the invention and to a welded joint made by this method.

A known method of bonding one end of a single-surface-coated magnetic tape to an end of a plastic leader tape consists in cementing the two tapes to one another. It has been found that the strength of such a cemented bond is not entirely satisfactory under all operating conditions; in the case of extreme stress, for example when such a joint is passed with a high tension around a small-diameter guide-pin, the cemented joint may come undone or one of the tapes may snap near the joint. Further, cemented joints are undesirable in any manufacturing process, since the cementing device must frequently be cleaned.

It is an object of the invention to eliminate these difficulties in a simple manner. The method according to the invention is characterized in that the end of the magnetic tape is disposed with its uncoated surface on the end of the leader tape so as to overlap it, after which an ultrasonic vibration field, being substantially concentrated in a strip-shaped area extending in the longitudinal direction of the tapes and being oriented at right angles to the tape planes, is briefly applied to the overlapping tapes, while at the same time static pressure is exerted on the said field having an overall width at least equal to the width of the narrower tape and an overall length greater than the spacing between the ends of the two overlapping tapes. This very simple method provides welded joints which have proved very strong and robust, and this is particular is due to the fact that the bond is made directly between the plastic materials of the two tapes and comprises both tape ends, the strip-shaped field concentration preventing excessive lateral pressing away of the material, which during the welding operation is soft, and simultaneously producing a stamping effect which increases the strength of the bond. When in such a method the magnetic tape has a smaller thickness than the leader tape, it has proved of advantage for the ultrasonic vibration field to be applied from that direction where the coated surface of the magnetic tape is situated, because thus the thinner tape is as it were pressed into the thicker one.

According to the invention, an apparatus for carrying out the method according to the invention is characterized in that for supporting the tape ends provision is made of an anvil having a substantially smooth work surface onto which an ultrasonic vibrator may be lowered which has a vibration surface having a width which is at least equal to the width of the narrower tape and a length greater than the spacing between the ends of the overlapping tapes, ribs or ridges which extend substantially in the direction of length of the two tapes being formed on this surface. This choice of the dimensions and the shape of the vibration surface ensures that the welded joint optimally covers the range of transition and overlapping of one tape to the other, resulting in a high strength of the bond and specifically preventing one tape from peeling off from the other. It should be remarked here that indeed, several apparatus are known which generally use ultrasonic vibrations for welding sheets of plastic material to one another. However, the ultrasonic vibrators of such known apparatus are shaped so as to enable a seam to be made by them on the plastic sheets. Hence, their vibrating surfaces are in the form, for example, of an edge, as is shown in U.S. Pat. No. 3,022,814, or of a ball, as is shown in Austrian Pat. No. 265,626.

For an apparatus according to the invention it has proved particularly advantageous for the height of the ribs formed on the vibration surface to be of the order of the tape thickness. This ensures satisfactory pressing and perfect welding of the entire tape areas under the vibration surface. Furthermore, it has proved particularly advantageous for the vibration surface to have a rib formed on it in each area which cooperates with the tape edges, with the result that the tape edges are welded together particularly firmly, which efficiently counteracts detachment of the tapes from one another.

A welded joint according to the invention is characterized in that it is formed with grooves which extend substantially in the direction of length of the tapes in, and on both sides beyond, the area of overlapping of the tapes. In an advantageous embodiment of such a welded joint a groove extends near each tape edge. In the case of a magnetic tape which is thinner than the leader tape the grooves are advantageously formed in the coated surface of the tape.

Figure 2:
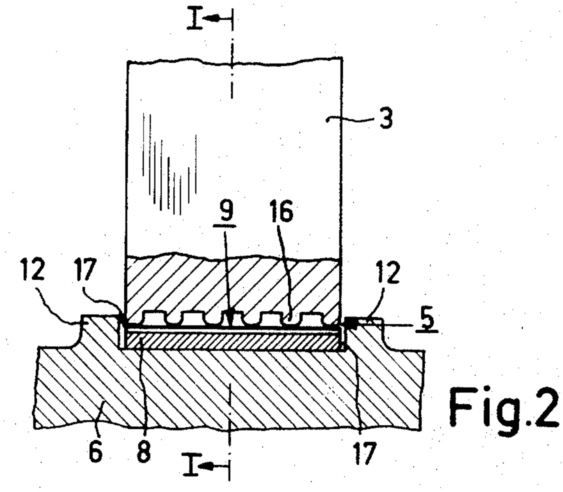
Figure 3:
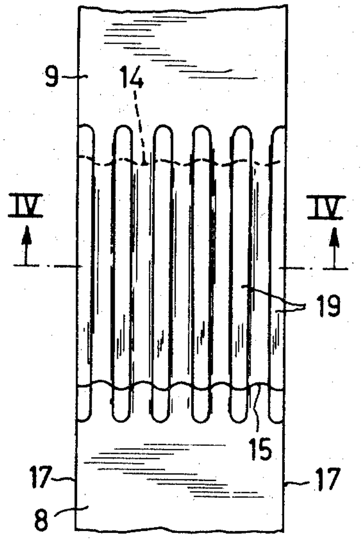
Figure 4:
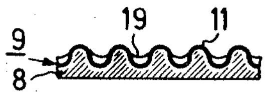

An embodiment of the invention will now be described, by way of non-limitative example, with reference to the accompanying diagrammatic drawings, in which:

FIG. 1 is a sectional view of an apparatus for carrying out the method according to the invention, taken on a line I—I of FIG. 2, FIG. 2 is a sectional view of part of the apparatus shown in FIG. 1, taken on a line II—II of FIG. 1, FIG. 3 is a top plan view of a welded joint according to the invention as produced by means of the apparatus shown in FIGS. 1 and 2, and FIG. 4 is a sectional view of this joint taken on a line IV—IV of FIG. 3.

The apparatus shown in FIGS. 1 and 2 comprises an ultrasonic vibrator 1 consisting of a magnetostrictive transducer 2 and an amplitude transformer 3. Electric energy may be supplied to the transducer via windings 4. The end face 5 of the amplitude transformer is the vibration surface which delivers the ultrasonic vibrations. The ultrasonic vibrator is arranged opposite an anvil 6 which has a substantially smooth work surface 7 which extends at right angles to the axis of the amplitude transformer 3 and is spaced from the vibration surface 5.

The method according to the invention for bonding one end of a magnetic tape, which comprises a base of a thermoplastic material coated on one surface to an end of a leader tape made of a thermoplastic material, consists in that there are placed on the work surface 7 of the anvil 6 from one side an end 8 of the leader tape and on top of this, from the other side, an end 9 of the magnetic tape with the uncoated surface 10, i.e. with the plastic base, facing the leader, so as to overlap the latter. The required positions of the ends of the two tapes may be indicated by marks provided on the anvil, ensuring that the length of overlapping of the two tapes is always the same. Thus, the coated surface 11 of the magnetic tape faces the vibration surface 5. Abutment faces 12 of the anvil serve to define the position and for lateral guiding of the tapes 8 and 9. The tapes are held to the anvil by means of a vacuum device which through a controllable valve communicates with vacuum tubes 13 which open in the tape supporting surface of the anvil, so that the tapes are held on the anvil in their relative positions by means of a partial vacuum.

Subsequently an ultrasonic vibration field, which is concentrated substantially to a strip-shaped area extending in the direction of length of the tapes and which is oriented at right angles to the planes of the tapes is briefly applied together with static pressure on the superjacent tapes by lowering the ultrasonic vibrator, pressing it on the tape ends and briefly energizing it, whereupon the two tape ends are bonded to one another by the welding together of the plastic materials. The vibration field has an overall width which is at least equal to the width of the narrower tape and has an overall length which is greater than the spacing between the ends of the two overlapping tapes.

The special configuration of the ultrasonic vibration field is obtained by the vibration surface 5 of the ultrasonic vibrator of the apparatus having a width at least equal to the width of the narrower tape 8 or 9 and a length greater than the spacing between the ends 14 and 15 of the two overlapping tapes 8 and 9 and is formed with ribs 16 which extend in the direction of length of the two tapes and produce the strip-shaped field concentration. The ribs may also extend at an angle, for example at 30°, to the direction of length of the tape. The height of the ribs is advantageously of the order of the tape thickness.

After the ultrasonic vibrator 1 has been raised again and the source of vacuum has been disconnected from the tubes 13 so that the partial vacuum in these tubes collapses, the bonded tapes may be taken from the apparatus.

As FIG. 2 shows, the vibration surface 5 has a rib 16 in each area which cooperates with a tape edge 17. This ensures that in particular the tape edges of the two tapes are firmly secured together, resulting in a particularly high resistance of the bond against peeling off of one tape from the other, since such a peeling off mostly starts at the edges of the bond.

FIGS. 3 and 4 show a welded joint made by the afore-described method. In practice such a bond between a magnetic tape of 3.81 mm. width and of 0.026 mm. thickness and a leader tape equally wide and of 0.09 mm. thickness was made with the tapes overlapping one another through 2 mm. The vibration surface of the ultrasonic vibrator was 3.5 mm. long and of the same width as the tapes, and six ribs 0.07 mm. high were distributed over this width, one rib being disposed close along each of the two edges of the vibration surface in the direction of length of the tape. This vibration surface was placed on the tapes with a static pressure of about 5 kp. for about one second, the vibrator being energized for about one third of this time. The direction of vibration (indicated by the double-headed arrow 18 in FIG. 1) was oriented substantially at right angles to the planes of the tapes. The vibration may also include components at right angles to this direction.

By the action of a vibration surface of the afore-described type, grooves 19 corresponding to the ribs 16 formed on the vibration surface are produced in that surface of the welded joint which comes into active contact with this vibration surface. In the area of overlapping of the two tapes welding is effected throughout the surface area and with a particular strength at the locations of the grooves. There is a groove along each tape edge 17, so that there will be maximum resistance to the tape edge becoming detached from one another. However, the tape parts laterally adjoining the tape ends 14 and 15 have fallen within the range of the vibration field, so that these transitional regions also are perfectly welded together.

As will be seen, the entire surface areas of the overlapping parts of the tapes are involved in the welding process in which the edges along the areas of overlapping also are accurately joined to one another, and both these features are important for a high strength of the bond. A further essential requirement is that the field of vibration should have the described strip-shaped concentrations, which give rise to local stamping effects which further increase the strength of the bond.

In the embodiment under consideration, the field of vibration was applied in a direction from the coated surface of the magnetic tape, and this procedure has proved of advantage in the case of a magnetic tape which is thinner than the leader tape. In principle, the tapes may be disposed on the anvil in reverse order, i.e. with the coated surface of the magnetic tape in contact with the anvil and the vibration field acting from the side of the leader tape. However, an essential requirement is that in the area in which the tapes overlap a plastic surface of one tape lies directly on a plastic surface of the other tape. The method according to the invention is suitable for tapes of different widths to be bonded to one another. In such a case the ultrasonic vibration field is made at least as wide as the narrower tape.

In the embodiment described, the grooves are more or less rectangular in cross-section. However, a semicircular cross-section also yielded satisfactorily results. It is not necessary for the ribs to be absolutely straight, but they may, for example, be undulatory.

As will be seen, several modifications of the afore described embodiment are possible without departing from the scope of the invention.

What is claimed is:

1. A method of bonding an end of a magnetic tape comprising a base of a thermoplastic material coated on one surface to an end of a thermoplastic leader tape, characterized in that the end of the magnetic tape is disposed with its uncoated surface on the end of the leader tape so as to overlap it, after which an ultrasonic vibration field, being substantially concentrated in a strip-shaped area extending in the longitudinal direction of the tapes and being oriented at right angles to the tape planes, is briefly applied to the overlapping tapes, whilst at the same time static pressure is exerted on them, said field having an overall width at least equal to the width of the narrower tape and an overall length greater than the spacing between the ends of the two overlapping tapes.

2. A method as claimed in claim 1, characterized in that in the case of the magnetic tape having a thickness which is less than that of the leader tape, the ultrasonic vibration field is applied from that direction where the coated surface of the magnetic tape is situated.

3. Apparatus for carrying out the method as claimed in claim 1 characterized in that for supporting the tape ends provision is made of an anvil having a substantially smooth work surface, on to which an ultrasonic vibrator may be lowered which has a vibration surface having a width which is at least equal to the width of the narrower tape and a length greater than the spacing between the ends of the two overlapping tapes, ribs which extend substantially in the direction of length of the two tapes being formed on this surface.

4. Apparatus as claimed in claim 3, characterized in that the height of the ribs formed on the vibration surface is of the order of thickness of a tape.

5. Apparatus as claimed in claim 3 characterized in that the vibration surface has a rib in both areas which cooperate with the tape edges.

6. A welded joint between an end of a magnetic tape having a base of a thermoplastic material coated on one surface and an end of a thermoplastic leader tape comprising a plurality of grooves formed in the tapes which extend substantially in the direction of length of the tapes in and on both sides beyond the area of overlapping of the tapes.

7. A welded joint as claimed in claim 6, wherein a groove extends near each tape edge.

8. A welded joint as claimed in claim 6 wherein the grooves are formed in the coated surface of magnetic tape in the case of a magnetic tape having a thickness smaller than the thickness of the leader tape.

9. A welded joint as claimed in claim 6 wherein said grooves are formed by ultrasonic vibrations.

10. A method of bonding an end of a magnetic tape having a base of a thermoplastic material coated on one surface thereof to an end of a thermoplastic leader tape, comprising the steps of placing the end of the magnetic tape on the end of the leader tape so as to overlap it with the uncoated side of the magnetic tape facing the leader tape, briefly applying an ultrasonic vibration field to the overlapping tapes, said field being substantially concentrated in a strip-shaped area extending in the longitudinal direction of the tapes and oriented at right angles to the plane of the tapes, and simultaneously exerting static pressure on said overlapping tapes, said field having an overall width at least equal to the width of the narrower tape and an overall length greater than the spacing between the ends of the two overlapping tapes.

11. The method as claimed in claim 10, wherein said ultrasonic vibration field is applied from the direction where the coated surface of the magnetic tape is located when the magnetic tape has a thickness which is less than that of the leader tape.

12. Apparatus for carrying out the method as claimed in claim 10 comprising an anvil having a substantially smooth work surface for supporting the tape ends, an ultrasonic vibrator arranged so that it may be lowered onto said anvil, said vibrator having a vibration surface having a width which is at least equal to the width of the narrower tape and a length greater than the spacing between the ends of the two overlapping tapes, and ribs which extend substantially in the direction of length of the two tapes being formed on this surface.

13. Apparatus as claimed in claim 12 wherein the height of the ribs formed on the vibration surface are of the order of thickness of a tape.

14. Apparatus as claimed in claim 12 wherein the vibration surface has a rib in both areas which cooperate with the tape edges.

References Cited

UNITED STATES PATENTS

| | | | |
|---|---|---|---|
| 3,519,507 | 7/1970 | Pierson | 156—73 |
| 3,612,385 | 10/1971 | Humpage | 156—228.1 |

NORMAN G. TORCHIN, Primary Examiner

A. T. SURO PICD, Assistant Examiner

U.S. Cl. X.R.

156—502